Aug. 18, 1964

D. S. REYNOLDS 3,144,962

DISPENSING MECHANISM

Filed July 26, 1961

INVENTOR:
DONALD S. REYNOLDS
BY
Mazell, Johnston, Cook & Root
ATT'YS

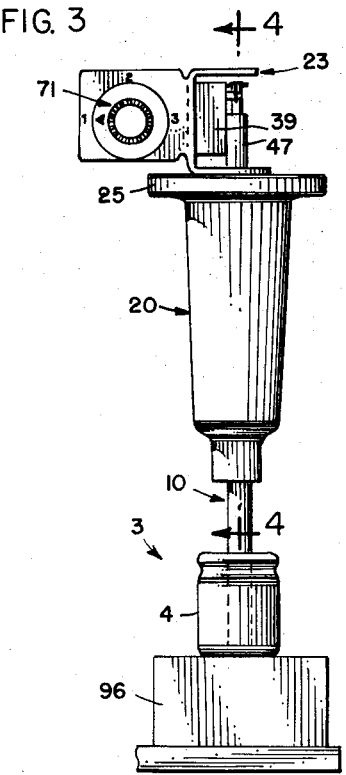
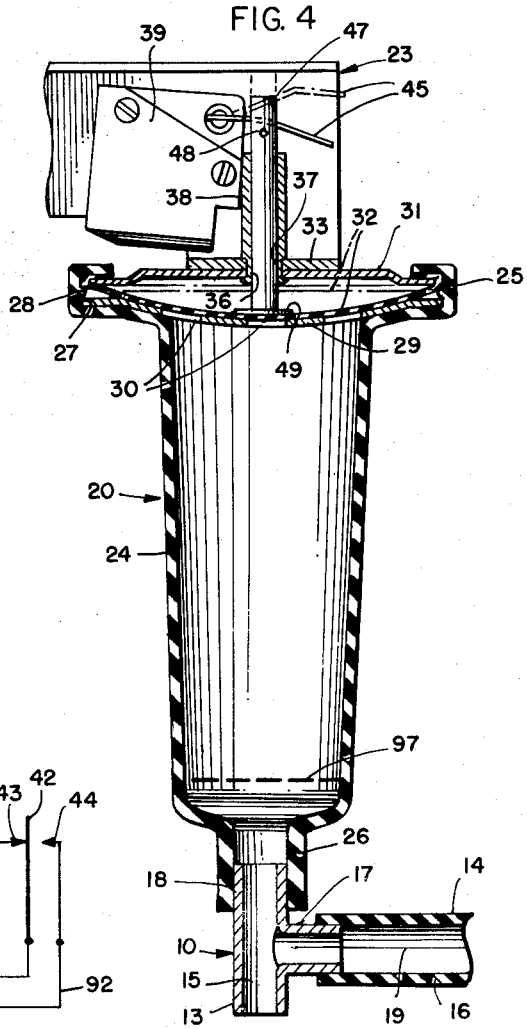
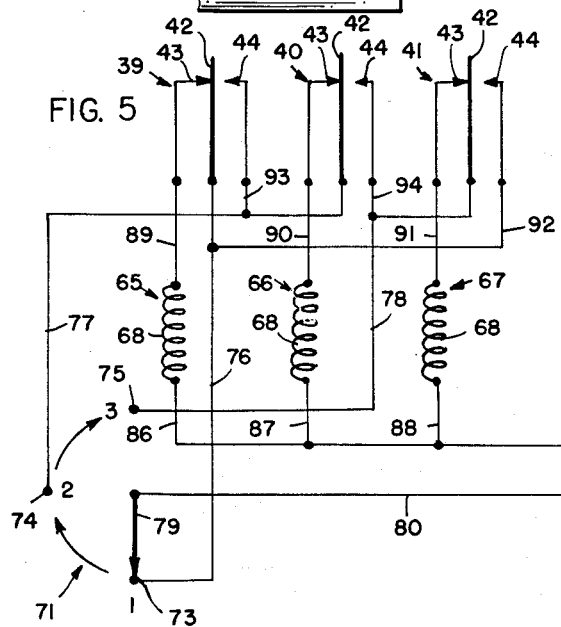
INVENTOR.
DONALD S. REYNOLDS

United States Patent Office 3,144,962
Patented Aug. 18, 1964

3,144,962
DISPENSING MECHANISM
Donald S. Reynolds, Wilmette, Ill., assignor to Automatic Canteen Company of America, Chicago, Ill., a corporation of Delaware
Filed July 26, 1961, Ser. No. 126,969
9 Claims. (Cl. 222—66)

This invention relates to dispensing mechanisms, and more particularly to dispensing mechanisms which are particularly well adapted for dispensing material from a plurality of sources of supply of such material.

It is a primary object of the present invention to afford a novel dispensing mechanism for dispensing material from a plurality of sources of such material.

Another object is to afford a novel dispenser mechanism of the aforementioned type which, although it is not limited thereto, is particularly well adapted for use in coin-operated commercial vending machines, and the like, for dispensing liquid.

In the use of coin-controlled commercial vending machines, and the like, an operator or serviceman commonly services the machine only periodically. During each servicing of such a machine, or the like, the serviceman replenishes the supply of the product or products being vended. In such operation, it is, of course, the purpose and intention to always maintain in the machine an adequate supply of the product or products to be vended therefrom so that the machine will not be out of operation because of an exhausted supply of such product or products. Oftentimes, this requires a substantial supply capacity in the machine, and where the product is of the type which is normally in bulk form, such as, for example, cream, for coffee vending machines, or syrup, for soft drink vending machines, and the like, the volume required of such a product can produce substantial complications. Thus, for example, in a coffee vending machine, or the like, of the type in which liquid cream must be stored in substantial quantities, it is highly desirable that the cream be dispensed from the machine on a first-in-first-out basis so as to prevent spoilage. However, heretofore, it has been common practice in the trade to store such product to be dispensed in a single container in such machines. This has meant that, when replenishing the supply of such a product in such a machine, the serviceman has had to either merely add a new supply of the product to the remaining supply of such product, and thus mix the old with the new, or remove the remaining supply of the old product and completely replace the supply of that product. Both such practices are, of course, undesirable. The first-mentioned practice is undesirable because of the danger of eventually spoiling the quality of the product. The second-mentioned practice is undesirable because it is wasteful and economically unsound. It is an important object of the present invention to enable these problems to be overcome.

Another object of the present invention is to enable products to be dispensed from a supply thereof on a first-in-first-out basis in a novel and expeditious manner.

A further object is to enable products to be stored in a vending machine, or the like, in a plurality of relatively small containers rather than in a single container of larger volume, and to enable such products to be dispensed from the plurality of containers in a novel and expeditious manner.

Yet another object of the present invention is to afford a novel dispensing mechanism of the aforementioned type, wherein the dispensing of such a product from such a plurality of sources of supply thereof is automatically switched, in a novel and expeditious manner, from each source of supply to the next when the supply of the product in the source of supply from which dispensing is taking place becomes exhausted.

Another object is to afford a novel dispensing mechanism of the aforementioned type wherein the supply of the product to be dispensed may be quickly and easily replenished in a novel and expeditious manner.

Another object is to afford a novel dispensing mechanism of the aforementioned type, wherein a serviceman servicing a machine, or the like, embodying the same may quickly and easily set the machine, when replacing the supply of the product to be dispensed, so that at the completion of the servicing the product is next fed from the proper source of supply, and, thereafter, the dispensing will automatically be switched to the other sources of supply in proper sequence.

Yet another object of the present invention is to afford a novel dispensing mechanism of the aforementioned type which is operable to dispense liquids in a novel and expeditious manner.

An object ancillary to the foregoing is to afford a novel dispensing mechanism wherein liquids may be dispensed therefrom by siphon units in a novel and expeditious manner.

Another object is to afford a novel dispensing mechanism of the aforementioned type wherein the siphoning of liquid therefrom may be initiated in a novel and expeditious manner.

Another object of the present invention is to afford a novel dispensing mechanism of the aforementioned type embodying sensing mechanism constituted and arranged in a novel and expeditious manner for sensing the level of liquid to be dispensed therefrom.

Yet another object is to afford a novel dispensing mechanism of the aforementioned type wherein the sensing mechanism thereof includes suction cups constituted and arranged in a novel and expeditious manner.

A further object of the present invention is to afford a novel dispensing mechanism of the aforementioned type which is practical and efficient in operation and may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 3 is a side elevational view of a portion of the dispensing mechanism shown in FIG. 1;

FIG. 4 is an enlarged detail sectional view taken substantially along line 4—4 in FIG. 3; and FIG. 5 is a wiring diagram of the dispensing mechanism shown in FIG. 1.

Figure 1:
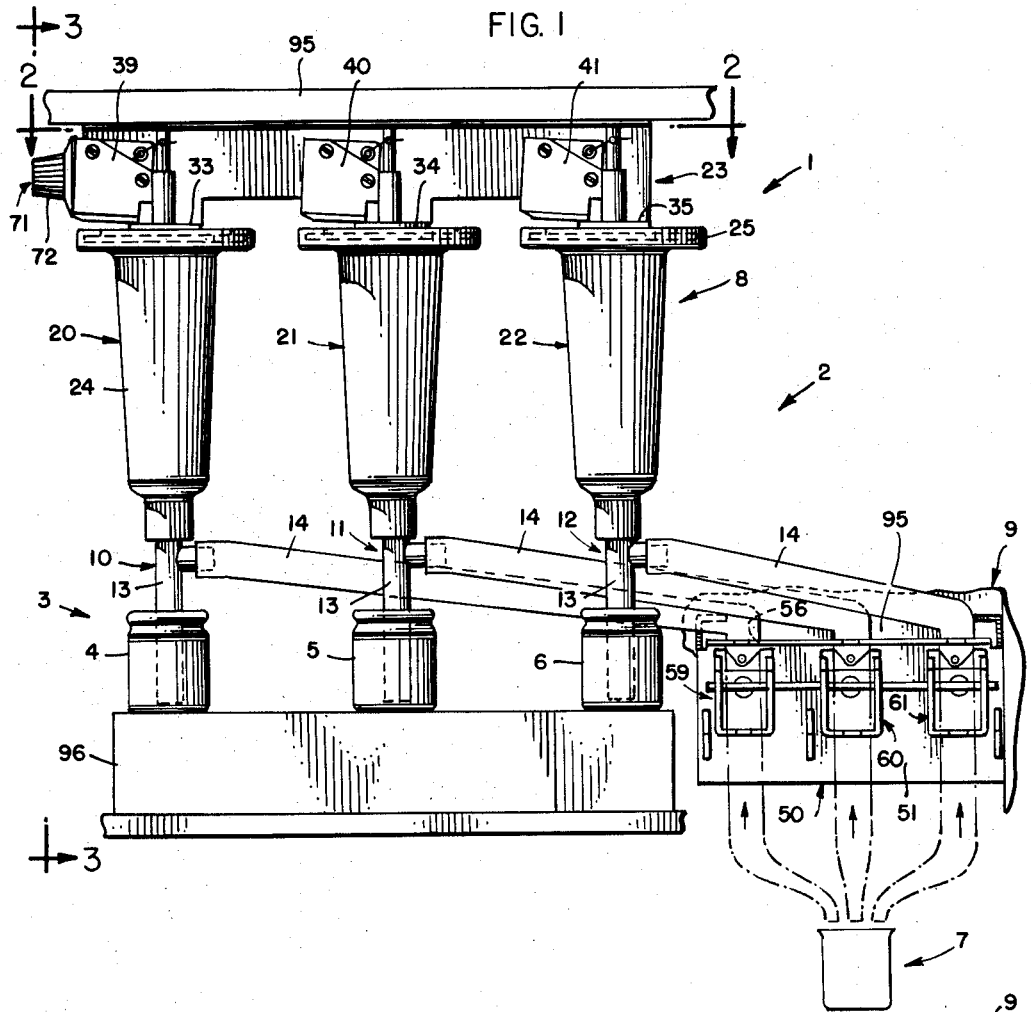
FIG. 1 is a front elevational view, partially diagrammatic in form, of a dispensing mechanism embodying the principles of the present invention.

A dispensing mechanism 1, embodying the principles of the present invention, is shown in the drawings to illustrate the preferred embodiment of the present invention.

The dispensing mechanism 1 includes, in general, a siphon apparatus 2 for feeding liquid from a supply source 3, such as a plurality of jars 4, 5, and 6, to a suitable receptacle such as a cup 7, with the siphon apparatus 2 connected between a sensing apparatus 8 and a flow control apparatus 9 in such a manner that discharge of liquid from the siphon apparatus 2 is controlled by the flow control apparatus 9, and the selection of which of the jars 4–6 the liquid is fed from is controlled by the sensing apparatus 8.

The siphon apparatus 2 includes a plurality of siphon units 10, 11, and 12, FIG. 1. The siphon units 10–12 are identical in construction, and each includes an inlet conduit 13 and an outlet conduit 14, FIGS. 1 and 4, which are flexible and resilient but are preferably self-supporting, and may be made of any suitable material such as, for example, flexible rubber or neoprene. Each of the inlet conduits 13 has a passageway 15 extending through the entire length thereof. Each of the outlet conduits 14 includes an elongated tube or conduit 16 mounted on a nipple 17 formed integrally with, and projecting laterally outwardly from, the upper end portion of the respective inlet conduit 13, FIGS. 1 and 4. Each of the outlet conduits 14 has a passageway 19 extending throughout the length thereof, and the nipples 17 open into the passageways 15 of the respective inlet conduits 13 from which they project, to thereby afford direct communication between the passageways 15 and 19 in each of the siphon units 10–12.

The sensing mechanism 8 includes three elongated flexible cups 20, 21, and 22, FIGS. 1 and 4, which are suspended from and supported by a suitable supporting frame or housing 23. The cups 20–22 are all identical in construction, and each includes an elongated, flexible body portion 24, which is circular in transverse cross section, and tapers generally inwardly from a flange 25 on the upper end thereof to a substantially cylindrical-shaped outlet sleeve 26 on the lower end thereof, FIG. 4. The body portion 24 of each of the cups 20–22 is hollow throughout its length, and may be made of any suitable resilient, pliable material such as, for example, rubber or neoprene.

Each of the flanges 25 on the upper end portions of the body members 24 of the cups 20–22 has a radially inwardly opening annular recess 27 formed therein, with a radially inwardly projecting annular rib 28 formed in the recess and dividing the latter substantially midway between the upper and lower edge portions thereof, FIG. 4. A substantially circular partition plate 29, which is convex downwardly, is mounted in the recess 27 in each of the flanges 25 below the rib 28. The partition plates 29 have a plurality of openings 30 extending therethrough for a purpose which will be discussed in greater detail presently.

An end plate 31 is also mounted in each of the flanges 25 of the body portions 24 of the cups 20–22, the end plates 31 being disposed in the respective recesses 27 above the ribs 28. An imperforate diaphragm 32 is mounted in the recess 27 of the flange 25 of each of the body portions 24 between the end plates 31 and the ribs 28 in the respective flange 25. The diaphragm 32 may be made of any suitable flexible, resilient material, such as, for example, sheet rubber or sheet neoprene, and the outer peripheral edge portion thereof is clamped between the outer peripheral portion of the respective end plate 31 and the adjacent surfaces of the flange 25 extending therearound, FIG. 4. The flanges 25 preferably fit around the respective plates 29 and 30 with a relatively snug fit, and to insure that the diaphragms 32 will remain in place in the flanges 25, the peripheral edge portions of the diaphragms 32 may be folded over the adjacent peripheral edge portion of the end plates 31 so as to insure that they are snugly clamped between the end plates 31 and the respective flanges 25. The diaphragms 32 are secured under tension to the adjacent end plates 31 in such a manner that, when the cups 20–22 are open to the atmosphere so that the pressure on both sides of the diaphragm 32 is equal, the diaphragm 32 extends substantially horizontally across the adjacent end plate 31 in the position shown in broken lines in FIG. 4. The partition plate 29 is bowed downwardly away from the adjacent end plate 31 a sufficient distance to permit the diaphragm 32 therebetween to move downwardly a substantial distance from its aforementioned horizontally extending position into a convex downwardly position, as shown in solid lines in FIG. 4, when the pressure above the diaphragm 32 is greater than the pressure below the diaphragm 32, for a purpose which will be discussed in greater detail presently.

The plates 29 and 31 may be made of any suitable material such as, for example, stainless steel, or the like, and the supporting frame 23 has three supporting brackets 33, 34, and 35 projecting laterally outwardly therefrom and secured to the upper faces of the end plates 31 of the cups 20–22, respectively, in position to suspendingly support the cups 20–22 in downwardly projecting, parallel spaced relation to each other, FIGS. 1 and 4. Each of the end plates 31 has an opening 36 extending transversely through the center thereof, and each of the brackets 33–35 has a similar opening 37 extending therethrough in axial alignment with the opening 36 in the plate 31 attached thereto. Also each of the brackets 33–35 has an elongated hollow sleeve 38 mounted thereon and projecting upwardly therefrom in axial alignment with the opening 37 therethrough. The end plates 31 and the sleeves 38 may be secured to the respective brackets 33–35 in the aforementioned positions thereof by any suitable means such as, for example, welding.

Three switches 39, 40, and 41 are secured to the supporting frame 23 adjacent to the sleeves 38 on the brackets 33–35, respectively, FIGS. 1 and 4. The switches 39–41 are identical in construction, each being a single-pole, double-throw switch having a movable contact 42 movable between a position wherein it is engaged with a stationary contact 43 and a position wherein it is engaged with a stationary contact 44, as diagrammatically illustrated in FIG. 5. Each of the switches 39–41 also includes an actuating member 45 connected to the movable contact 42 thereof in such a manner that when the actuating member 45 is disposed in its lowermost position as shown in solid lines in FIG. 4, the movable contact 42 is disposed in engagement with the stationary contact 43 and is disposed out of engagement with the stationary contact 44, and when the actuating member 45 is disposed in its uppermost position, as shown in broken lines of FIG. 4, the movable contact 42 operatively connected thereto is disposed in engagement with the stationary contact 44 and out of engagement with the stationary contact 43.

Each of the switches 39–41 also includes a plunger 47 secured to the actuating member 45 thereof by suitable means such as a pin 48, and the switches 39–41 are so disposed relative to the mounting brackets 33–35 that the plungers 47 are reciprocably mounted in the sleeves 38 of the mounting brackets 33–35, respectively. The plungers 47 are of such length that they extend downwardly through the end plates 31 of the respective cups 20–22, and each plunger 47 has an enlarged head 49 on the lower end portion thereof which is disposed in engagement with the upper face of the diaphragm 32 in the respective one of the cups 20–22. The actuating members 45 are spring urged by a spring, not shown, toward the lowermost position thereof shown in solid lines in FIG. 4, and the movement of the diaphragms 32 in the cups 20–22 between the raised position shown in broken lines in FIG. 4 and the fully downwardly deflected position shown in solid lines in FIG. 4 is of such magnitude as to be effective to move the actuating member 45 between the raised position shown in broken lines in FIG. 4 and the lowered position shown in solid lines in FIG. 4. Hence, it will be seen that when the diaphragm 32 in any one of the cups 20–22 is disposed in fully downwardly deflected position as shown in solid lines in FIG. 4, the movable contact 42 of the respective one of the switches 39–41 associated with that cup is disposed in engagement with the stationary contact 43 of that particular switch, and when the diaphragm 32 is disposed in uppermost position shown in broken lines in FIG. 4, the movable contact 42 of that respective switch is then disposed in engagement with the stationary contact 44 of that switch, for a purpose which will be discussed in greater detail presently.

Figure 2:
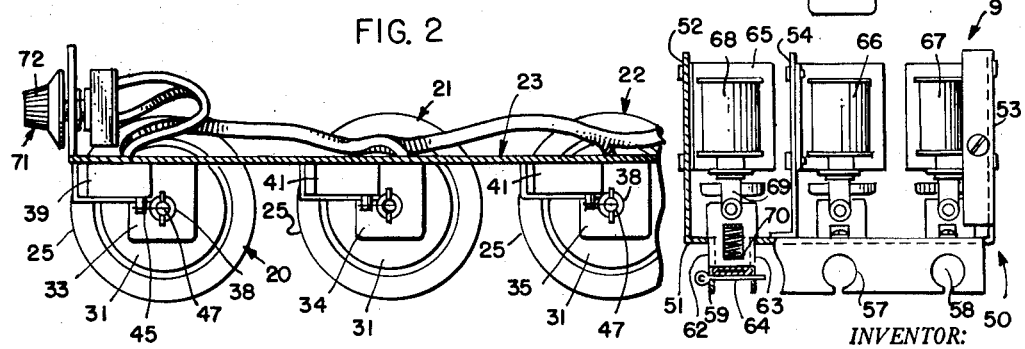
FIG. 2 is a top plan view of the dispensing mechanism shown in FIG. 1.

The flow-control mechanism 9 includes a supporting frame or housing 50, FIGS. 1 and 2, which includes a substantially upright front wall 51, two end walls 52 and 53 projecting rearwardly therefrom, and a partition wall 54 disposed between the end walls 52 and 53 and projecting rearwardly from the front wall 51 in substantially parallel relation to the end walls 52 and 53. The front wall 51 of the supporting frame 50 has a flange 55 projecting forwardly from the upper edge portion thereof, and the flange 55 has three openings 56, 57, and 58 extending transversely therethrough, with the openings 56–58 equally spaced from each other longitudinally of the flange 55. Three mounting brackets 59, 60, and 61 are mounted on the front wall 51 of the supporting frame 50 below the flange 55, and projecting forwardly from the front wall 51 vertically below the openings 56, 57, and 58 respectively. The mounting brackets 59 are identical in construction and each includes two upstanding side walls 62 and 63 projecting forwardly from the front wall 51 in parallel spaced relation to each other, and a suitable abutment member such as, for example, a pin 64 mounted in and extending between the side walls 62 and 63 in forwardly spaced relation to the front wall 51.

The openings 56–58 are of such size that the lower end portions of the outlet conduits 14 of the siphon units 10–12, respectively, may be extended downwardly therethrough, with the outlet conduits 14 of the siphon units 10–12 extending downwardly through the brackets 59–61, respectively, between the abutment member 64 thereof and the front face of the front wall 51 of the supporting frame 50. From the brackets 59–61, the lower end portions of the outlet conduits 14 may extend downwardly into position to discharge into a suitable discharge station or receptacle such as, for example, the cup 7 shown in FIG. 1.

Three solenoids 65, 66, and 67 are mounted on and supported by the walls 52, 54, and 53, respectively, of the supporting frame 50, FIG. 2. Each of the solenoids 65–67 is identical in construction, and each includes a suitable winding 68 and a plunger 69. Each of the solenoids 65–67 is so constructed that when its winding 68 thereof is not energized, its plunger 69 is disposed in full outwardly projecting position as shown in solid lines in FIG. 2, and when the winding 68 is energized, the plunger 69 is disposed in fully retracted position (not shown). Each of the plungers 69 extends through and is reciprocably mounted in the front wall 51 of the frame 50 directly horizontally rearwardly of a respective one of the abutment members 64, and each includes an enlarged head 70 disposed within the brackets 59–61, respectively. The heads 70 of the plungers 69 are disposed between the abutment members 64 and the front wall 51 in such position that when the plungers 69 are disposed in extended position they are effective to clamp the outlet conduits 14 disposed in the brackets 59–61 against the respective abutment members 64 in such position as to close the conduits 14 and thereby stop any flow of liquid therethrough. However, the heads 70 of the plungers 69 are so disposed in the brackets 59–61 that when the plungers 69 are disposed in fully retracted position, the heads 70 are spaced from the abutment members 64 a sufficient distance to permit the outlet conduits 14 to fully open and thereby permit the free flow of liquid therethrough.

A selection switch 71, having a manually operable actuating member 72, is mounted on the supporting frame 23 of the sensing apparatus 8 to permit a serviceman, or the like, to properly set the dispensing mechanism 1 after a servicing operation, as will be discussed in greater detail presently. As is shown in FIG. 5, the selector switch 71 includes three stationary contacts 73, 74, and 75 connected by suitable conductors 76, 77, and 78 to the movable contacts 42 of the switches 39–41, respectively. The selector switch 71 also includes a movable contact 79 which is connected through a conductor 80, a control switch 81, and a conductor 82 to one side 83 of a suitable source of electric power, not shown. Another conductor 84 is connected to the other side 85 of the aforementioned source of electric power, and is connected by conductors 86, 87, and 88 to one side of the windings 68 of the solenoids 65–67, respectively. The other sides of the windings 68 of the solenoids 65–67 are connected by conductors 89, 90, and 91 to the stationary contacts 43 of the switches 39–41, respectively.

The conductors 76–78 connected between the stationary contacts 73–75 of the selector switch 71 and the movable contacts 42 of the switches 39–41, respectively, are also connected at all times to certain ones of the stationary contacts 44 of other ones of the switches 39–41. Thus, it will be seen that the conductor 76 is connected by a conductor 92 to the stationary contact 44 of the switch 41; the conductor 77 is connected by a conductor 93 to the stationary contact 44 of the switch 39; and the conductor 78 is connected by a conductor 94 to the stationary contact 44 of the switch 40.

The movable contact 79 of the selector switch 71 is manually rotatable by manipulation of the actuating member 72 into position wherein it is engaged with any one of the stationary contacts 73–75 of the switch 71. With this arrangement, the dispensing mechanism 41 may be adjusted so that any desired one of the conductors 76–78 may be directly connected through the movable contact 79 to the conductor 80. This is important in properly setting the dispensing mechanism 1 for proper first-in-first-out operation as will be discussed in greater detail presently.

In assembling the novel dispensing mechanism 1 in a suitable vending or dispensing apparatus such as, for example, a coin-controlled commercial vending machine, or the like, the supporting frame 23 of the sensing mechanism 8 and the supporting frame 50 of the flow-control mechanism 9 may be attached to a suitable supporting member such as a wall 95 of the apparatus, FIG. 1. The supporting frames 23 and 50 are preferably so disposed in the apparatus that the outlet conduits 14 of the siphon apparatus 2 extend downwardly throughout their length from their connections with the respective inlet conduits 13, and the plungers 69 of the solenoids 65–67 are disposed below the lower ends of the inlet conduits 13. The storage receptacles, such as the jars 4–6, may also be supported in the apparatus by a suitable supporting member, such as a shelf 96, FIG. 1. The jars 4–6 are preferably supported in such position that the inlet conduits 13 of the siphon units 10–12 extend downwardly into the jars 4–6, respectively, and terminate at their lower ends closely adjacent the bottoms of the respective jars 4–6. The lower ends of the outlet conduits 14 of the siphon units 10–12 project downwardly from the plungers 69 of the solenoids 65–67, respectively, and terminate at their lower ends in position to discharge into a suitable discharge station or receptacle in the apparatus such as, for example, the cup 7 shown in FIG. 1.

With the dispensing mechanism 1 thus assembled in a dispensing apparatus, or the like, and with the jars 4–6 full of the liquid to be dispensed by the dispensing mechanism 1, the operator may quickly and easily fill each of the siphon units 10–11 in preparation for operation thereof. Thus, for example, to prepare the siphon unit 10 for operation, the operator may first manually compress the side walls of the body portion 24 of the cup 20, with the plunger 69 of the solenoid 65 clampingly closing the lower end portion of the outlet conduit 14 of the siphon unit 10, and with the inlet conduit 13 extending into the liquid in the jar 4. In this operation the side wall 24 of the cup 20 is preferably compressed to such extent that the major portion of the air in the cup 20 is expelled downwardly therefrom through the inlet conduit 13 so that it escapes to the atmosphere through the liquid in the jar 4. The operator may then release the body portion 24 of the cup 20 to thereby permit the side walls thereof to move back out into the normal position therefor shown in FIG. 4. The partial vacuum created in the cup 20 by this latter outward movement of the side walls of the body portion 24 thereof causes liquid in the jar 4 to be drawn upwardly through the inlet conduit 13 of the siphon unit 10 into the cup 20. The operator may then manually move the plunger 69 of the solenoid 65 to retracted position, and thus open the outlet conduit 14 of the siphon unit 10 to thereby permit liquid to flow downwardly from the cup 20 through the outlet conduit 14. After flow of liquid through the outlet conduit 14 has been established to such an extent that the conduit 14 is completely full of liquid above the plunger 69 of the solenoid 65, the operator may release the plunger 69 to thereby permit the latter to move outwardly into fully extended position and thereby clamp the outlet conduit 14 of the siphon unit 10 against abutment member 64 and thereby close the outlet conduit 14 of the siphon unit 10. When the outlet conduit 14 of the siphon unit 10 is closed in this operation the upper level of the liquid in the siphon unit 10 is above the outlet passageway 19. Thus, it will be seen that at the completion of the aforementioned operation, the siphon unit 10 is full of the liquid to be disposed therefrom so that, subsequently, if the plunger 69 of the solenoid 65 is retracted, flow from the jar 4 through the inlet 13 and the outlet conduit 14 of the siphon unit 10 automatically resumes by siphoning action. Such flow will continue each time the outlet conduit of the siphon unit 10 is opened by retraction of the plunger 69, until the level of the liquid in the jar 4 fills below the lower end of the inlet conduit 13.

Also, when the siphon 10 has thus been filled, a partial vacuum still remains in the cup 20, which is sufficient to hold the diaphragm 32 therein in full downwardly deflected position, as shown in solid lines in FIG. 4. This partial vacuum is retained in the cup 20 until such time as the supply of liquid in the jar 4 falls to such a level as to open the interior of the cup 20 to the atmosphere through the siphon 10. When this occurs, the equalization of pressure on both sides of the diaphragm 32 in the cup 20 permits the diaphragm to move upwardly into the fully raised position shown in broken lines in FIG. 4, as previously discussed.

The above-described initial preparation of the siphon unit 10 may be repeated by the operator for each of the other siphon units 11 and 12, respectively, so that all of the siphon units 10–12 are prepared for automatic siphoning action whenever the plungers 69 of the solenoids 65–67, respectively, are retracted.

It will be remembered that when the siphon units 10–12 are filled with liquid, and are operable to siphon liquid from the jars 4–6, the partial vacuums in cups 20–22, respectively, are effective to hold the respective diaphragms 32 therein in downwardly deflected position, as shown in solid lines in FIG. 4, in which position the actuating members 45 of the switches 39–41, respectively, are permitted to assume the fully lowered position in solid lines in FIG. 4 to thereby engage the movable contacts 42 of the respective switches 39–41 with the stationary contacts 43, as shown in FIG. 5. After the siphon units 10–12 are thus filled, the operator may manually move the movable contact 79 of the selector switch 71 into engagement with the proper one of the stationary contacts 1–3. When all of the jars 4–6 have been newly replenished or replaced, it is immaterial which of the contacts 73–75 of the selector switch 71 is engaged by the actuating member 79. Subsequently, if during the next servicing operation only one or two of the jars 4–6 are replenished or replaced, the operator will preferably set the selector switch 71 in such position as to insure that the jar 4, 5, or 6, which has been in the apparatus the longest will be first jar from which liquid will be dispensed in the operating of the dispensing mechanism. This will insure that the liquid from the jars 4–6 will be dispensed from the dispensing mechanism 1 on a first-in-first-out basis as will be discussed in greater detail presently.

In the operation of the novel dispensing mechanism 1, when it is assembled in an apparatus, and has been prepared for an operation, in the aforementioned manner, and assuming that the operator has moved the movable contact 79 of the selector switch 71 into engagement with the stationary contact 73, liquid will first be dispensed from the jar 4. In such an operation, when the control switch 81 is closed, such as, for example, by being manually actuated, or automatically actuated by a coin-control mechanism, or the like, current will flow from the line contact 83 through the conductor 82, the switch 81, the conductor 80, the moveable contact 79 of the selector switch 71, the stationary contact 73, the conductor 76, the movable contact 42 and the stationary contact 43 of the switch 39, the conductor 89, the winding 68 of the solenoid 65, and the conductors 86 and 84 back to the otherside 85 of the line. It will be seen that with the movable contacts 42 of the switches 40 and 41 engaged with the contacts 43 thereof, no circuit is afforded through the windings 68 of the solenoids 66 and 67 between the line contacts 83 and 85, while the movable contact 42 of the switch 39 is engaged with its stationary contact 43. Hence, upon closing of the switch 81, the solenoid 68 is energized to thereby retract the plunger 69 of the solenoid 65 and thereby open the outlet conduit 14 of the siphon unit 10 and permit liquid to flow from the jar 4 outwardly through the outlet conduit of the siphon unit 10. Such flow of liquid through the siphon unit 10 will continue until the switch 81 is closed or the dispensable supply of liquid in the jar 4 is exhausted. When the switch 81 is again opened, the solenoid 65 is deenergized to thereby cause the plunger 69 thereof to again clampingly engage the outlet conduit 14 of the siphon unit 10 and thereby stop the flow of liquid from the jar 4.

When the liquid in the jar 4 drops below the lower end of the inlet conduit 13 of the siphon unit 10, or the level of the liquid in the siphon unit 10 drops below the nipple 17 thereof, air is permitted to flow into the cup 20 to thereby destroy the partial vacuum therein, and permit the diaphragm 32 therein to move upwardly into fully raised position as shown in broken lines in FIG. 4. This movement of the diaphragm 32 is effective to raise the plunger 47 resting thereon and thereby move the actuating member 45 of the switch 39 into fully raised position as shown in broken lines in FIG. 4. This movement of the actuating member 45 is effective to move the movable contact 42 of the switch 39 out of engagement with the stationary contact 43 of the switch 39 and into engagement with the stationary contact 44 thereof. This, it will be seen, breaks the electrical connection between the movable contact 42 of the switch 39 and the winding 68 of the solenoid 65, so that when the switch 81 is subsequently closed, the solenoid 65 will not energize.

However, the movement of the movable contact 42 of the switch 39 into engagement with the stationary contact 44 of that switch is automatically effective to connect the movable contact 42 of the switch 40 to control switch 81, so that such subsequent closing of the switch 81 will be effective to energize the solenoid 66 and thereby cause liquid to flow from the jar 5. The circuit for causing this latter flow of liquid extends from the line contact 83, through the conductor 82, the switch 81, the conductor 80, the movable contact 79 of the selector switch 71, the contact 73, the conductor 76, the movable contact 42 and the stationary contact 44 of the switch 39, the conductor 93, the conductor 77, the movable contact 42 and the stationary contact 43 of the switch 40, the conductor 90, the winding 68 of the solenoid 66, and the conductors 87 and 84 back to the other side 85 of the line. Hence, with the circuitry thus arranged in the dispensing unit 1, each closing of the switch 81 is effective to cause the liquid to be dispensed from the jar 5. When the liquid in the jar 5 drops to a level sufficient to break the partial vacuum in the cup 21, the movable contact 42 of the switch 40 is moved by the diaphragm 32 of the cup 21 out of engagement with the stationary contact 43 of the switch 40 and into engagement with the stationary contact 44 thereof.

This movement of the movable contact 42 of the switch 40 is effective to automatically disconnect the solenoid 66 from the switch 81 and simultaneously connect the winding 68 of the solenoid 67 to the switch 81 so that subsequent closing of the switch 81 will be effective to energize the solenoid 67 and cause liquid to be dispensed from the jar 6. The circuit through the solenoid 67 under such circumstances extends from the line contact 83 through the conductor 82, the switch 81, the conductor 80, the movable contact 79 of the selector switch 71, the contact 73, the conductor 76, the movable contact 42 and the stationary contact 44 of the switch 39, the conductors 93 and 77, the movable contact 42 and the stationary contact 44 of the switch 40, the conductors 94 and 78, the movable contact 42 and the stationary contact 43 of the switch 41, the conductor 91, the winding 68 of the solenoid 67, and the conductors 88 and 84 back to the other side 85 of the line. If the level of liquid in the jar 6 should drop to a point wherein the partial vacuum of the cup 22 were broken, so that the movable contact 42 of the switch 41 was moved by the movement of the diaphragm 32 in the cup 22 out of engagement with the stationary contact in the switch 41 and into engagement with the stationary contact 44 therein, while the jars 4 and 5 are empty, the circuits through all of the solenoids 65–67 would be opened so that subsequent closing of the switch 81 would be ineffective to energize the solenoids, the entire supply of dispensable liquid having been exhausted from the supply source 3. However, in practice, servicing calls for apparatus including the novel dispensing mechanism 1 will be made at sufficiently frequent intervals to insure that at least one of the jars 4–6 has sufficient liquid therein to insure continued operation of the dispensing mechanism.

One of the principle advantages of the novel dispensing mechanism 1 is that when an operator makes a service call on apparatus embodying such dispensing mechanism, he may merely replace that jar, or those jars 4, 5, or 6 from which the supply of liquid has been exhausted; fill the siphon units 10, 11, or 12 of the thus replaced jars and then set the movable contact 79 to that stationary contact 73, 74, or 75 which will be effective to directly connect the switch 81 to the switch 39, 40, or 41 associated with that jar 4, 5, or 6, from which dispensing is then occuring. Thus, for example, if on his service call, the operator found that jar No. 4 was empty and the dispensing mechanism was then dispensing from the jar 5, and the jar 6 was still completely full, it would merely be necessary for the operator to replace the empty jar 4 with a full jar 4 and prepare the siphon unit 10 for operation in the previously discussed manner. Thereafter, the operator may manually move the movable contact 79 of the selector switch 71 into engagement with the stationary contact 74, which is directly connected by the conductor 77 to the switch 40 associated with the jar 5 from which dispensing is to continue to take place. With the movable contact 79 thus positioned, closing of the switch 81 would be effective to establish a circuit from the line contact 83 through the conductor 82, the switch 81, the conductor 80, the movable contact 79, the stationary contact 74, the conductor 77, the movable contact 42 and the stationary contact 73 of the switch 40, the conductor 90, the winding 68 of the solenoid 66, and the conductors 87 and 84 back to the other side 85 of the line. Subsequently, when the supply of liquid in the jar 5 was exhausted and the movable contact 42 of the switch 40 was moved out of the engagement with the stationary contact 43 of the switch 40 and into engagement with the stationary contact 44, as previously described, this is automatically effective to switch the circuitry of the dispensing mechanism 1 so that closing of the switch 81 is effective to cause liquid to be fed from the jar 6. The circuit through the dispensing mechanism 1 under these conditions would extend from the line contact 83, the conductor 82, the switch 81, the conductor 80, the movable contact 79, the stationary contact 74, the conductor 77, the movable contact 42 and the stationary contact 44 of the switch 40, the conductors 94 and 78, the movable contact 42 and the stationary contact 43 of the switch 41, the conductor 91, the winding 68 of the solenoid 67, and the conductors 88 and 84 back to the other side 85 of the line. Subsequently, if the dispensable supply of fluid in the jar 6 became exhausted the resulting actuation of the switch 41 is automatically effective to switch the dispensing mechanism 1 so that it feeds from jar 4 upon each closing of the switch 81. The circuit for such operation would extend from line contact 83 to the movable contact 42 of the switch 41 in the same manner as just described for the circuitry through the solenoid 67. However, from the movable contact 42 of the switch 41, the circuit, instead of extending through the solenoid 67, would now extend through the movable contact 44 of the switch 41, the conductors 92 and 76, the movable contact 42 and the stationary contact 43 of the switch 39, the conductor 89, the winding 68 of the solenoid 65, and the conductors 86 and 84 back to the other side 85 of the line.

If in servicing the apparatus in which the dispensing unit 1 was embodied, the operator should desire to set the dispensing mechanism 1 so that it would first dispense from the jar 6, this may be readily accomplished by moving the movable contact 79 of the selector switch 71 into engagement with the stationary contact 75. With this setting of the selector switch 71, and with the jar 6 containing fluid to such a level that liquid may be dispensed therefrom through the siphon unit 12, closing of the switch 81 would close a circuit from the line contact 83 through the conductor 82, the switch 81, the conductor 80, the movable contact 79, the stationary contact 75, the conductor 78, the movable contact 42 and the stationary contact 43 of the switch 41, the conductor 91, the winding 68 of the solenoid 67, and the conductors 88 and 84 back to the other side 85 of the line, to thereby cause liquid to be dispensed from the jar 6.

When the dispensable supply of liquid in the jar 6 subsequently becomes exhausted, so that the switch 41 is actuated by the diaphragm 32 in the cup 22, to move the movable contact 42 thereof out of engagement with the contact 43 and into engagement with the contact 44, the switch 41 is automatically effective to change the circuitry of the dispensing unit 1 so that closing of the switch 81 is then effective to cause liquid to be dispensed from the jar 4. The circuitry for this operation would extend from the line contact 83 to the movable contact 42 of the switch 41 in the manner just described for feeding liquid from the jar 6. However, from the movable contact 42 of the switch 41 the circuit would then extend through the stationary contact 44 of the switch 41, the conductors 92 and 76, the movable contact 42 and the stationary contact 43 of the switch 39, the conductor 89, the winding 68 of the solenoid 65, and the conductors 84 and 86 back to the other side 85 of the line.

Subsequently, actuation of the switch 39 by exhaustion of the disposable liquid in the jar 4 is automatically effective to switch the circuitry through the dispensing unit 1 into position wherein liquid would next be dispensed from the jar 5. The circuit for this operation will then extend from the line contact 83 to the movable contact 42 of the switch 39 in the same manner as just described with respect to the operation wherein liquid was dispensed from the jar 4. However, from the movable contact 42 of the switch 39, the circuit would then extend through the stationary contact 44 of the switch 39, the conductors 93 and 77, the movable contact 42 and the stationary contact 43 of the switch 40, the conductor 90, the winding 68 of the solenoid 66, and the conductors 87 and 84 back to the other side 85 of the line.

From the foregoing, it will be seen that the novel dispensing mechanism 1 is automatically effective to switch from one supply source to another supply source upon exhaustion of the supply of the product to be dispensed from the first-mentioned source.

Also, it will be seen that the novel dispensing mechanism 1 affords a dispensing mechanism 1, which may be readily serviced and readily set for proper operation by an operator.

In addition, it will be seen that the novel dispensing mechanism 1 is operable in a novel and expeditious manner on a first-in-first-out basis whereby it is assured that the oldest product to be dispensed thereby is dispensed first.

Also, it will be seen that the novel dispensing mechanism 1 is practical and efficient in operation and may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A dispensing mechanism for dispensing liquid material comprising a plurality of containers for storing a supply of material to be dispensed, a plurality of siphon units, each of said siphon units being operatively connected to a respective one of said containers for feeding such material therethrough from said container, a plurality of electrically operable means, each of said electrically operable means having a portion movable into one position effective to open a respective one of said siphon units upon energization of said respective means, and movable into another position effective to close said respective siphon unit upon deenergization of said respective means, all of said means being normally de-energized, and means for sequentially energizing said electrically operable means, said last-mentioned means including a switch, sensing means connected to the top of said siphon units for sensing the level of said material in said container, a plurality of other switches, each of said other switches having a movable contact movable between one position wherein it is electrically connected to a respective one of said electrically operable means, and another position wherein it is electrically disconnected from said respective electrically operable means, each of said sensing means connected to the top of respective ones of said siphon units being operably connected to respective ones of said movable contacts to dispose said contact in said one position when the level of said material in said container to which said respective siphon unit is attached is above a predetermined level, and dispose said contact in said other position when the level of said material in said last-mentioned container is below said predetermined level.

2. A dispensing mechanism for dispensing liquids comprising a plurality of containers for storing said liquids, a plurality of substantially upright siphon units each having an elongated inlet conduit disposed in position to feed liquid into said siphon unit from a respective one of said containers, and a longer outlet conduit extending below said inlet conduit for discharging said last-mentioned liquid from said respective siphon unit, a plurality of diaphragm units operatively connected to the upper ends of respective ones of said siphon units for sensing the level of said liquid in said respective containers, each of said diaphragm units including a diaphragm responsive to the level of said liquid in said respective containers, said diaphragms being disposed in a lowered position when said liquid is disposed above a predetermined level in said container, said diaphragms being disposed in a raised position when said liquid is disposed below a predetermined level in said containers, a plurality of electrically operable clamping units for opening and closing said outlet conduits and thereby permit and prevent flow of said liquid through said siphon units from said containers, each of said clamping units being disposed in position to clampingly engage a respective one of said outlet conduits and thereby close the latter when said clamping unit is electrically energized and to be disengaged from said respective outlet conduit when said clamping unit is de-energized, said clamping units normally being electrically de-energized, means for electrically energizing said clamping units, and means for selectively controlling the energizing of said clamping units, said last-mentioned means including switches operatively connected to respective ones of said clamping units and to each other, said switches being operatively connected to said diaphragms and operable thereby.

3. A dispensing mechanism for dispensing liquids comprising a plurality of containers for storing said liquids, a plurality of substantially upright siphon units each having an elongated inlet conduit for feeding liquid into said siphon unit from said respective container, and a longer outlet conduit extending below said inlet conduit for discharging said last-mentioned liquid from said respective siphon unit, said inlet conduit extending downwardly into respective ones of said containers, a plurality of diaphragm units operatively connected to the upper ends of respective ones of said siphon units for sensing the level of said liquid in said containers, each of said diaphragm units including a diaphragm responsive to the level of said liquid in said respective containers, said diaphragms being disposed in a lowered position when said liquid is disposed above a predetermined level in said container, said diaphragms being disposed in a raised position when said liquid is dsposed below a predetermined level in said containers, a plurality of electrically operable clamping units for opening and closing said outlet conduits and thereby permit and prevent flow of said liquid through said siphon units from said containers, each of said clamping units being disposed in position to clampingly engage a respective one of said outlet conduits and thereby close the latter when said clamping unit is electrically energized and to be disengaged from said respective outlet conduit when said clamping unit is de-energized, said clamping units normally being electrically de-energized, means for electrically energizing said clamping units, and means for selectively controlling the energizing of said clamping units, said last-mentioned means including a plurality of switches, each of said switches including two stationary contacts, a movable contact movable between operative engagement with respective ones of said stationary contacts, and an actuating member operatively connected to said movable contact and operatively engaged by a respective one of said diaphragms and movable with the latter into position to move said movable contact into engagement with one and the other of said stationary contacts when said diaphragm is disposed in said lowered position and said raised position, respectively, said one stationary contact of each of said switches being at all times electrically connected in series with a respective one of said electrically operable clamping units and one side of a source of electric power, said other stationary contact of each of said switches being at all times electrically connected in series with said movable contact of a respective other one of said switches, and a normally open switch, said last-mentioned switch having one side electrically connected at all times to the other side of said source of electric power, and another side thereof electrically connected at all times to one of said movable contacts.

4. A dispensing mechanism as defined in claim 3, and which includes a selector switch electrically connected to said movable contacts and said other side of said normally open switch for selectively connecting said other side of said normally open switch to respective ones of said movable contacts.

5. A dispensing mechanism for dispensing liquid and comprising a plurality of containers for holding a supply of such liquid to be dispensed, and means for dispensing liquid from individual ones of said containers sequentially on a first-in-first-out basis, said means comprising a plurality of siphon units having inlet and outlet conduits, said inlet conduit of each of said siphon units extending downwardly into a respective one of said containers in position to feed said liquid from said container to said outlet conduit of said siphon unit, a plurality of solenoids, clamping members mounted on respective ones of said solenoids and movable thereby into one position when said respective solenoids are electrically energized, and into another position when said respective solenoids are de-energized, said clamping members being disposed in position to closingly clamp respective ones of said outlet conduits when said clamping member is disposed in said other position and to be disposed out of said clamping relation to said respective outlet conduit when said clamping member is in said one position, suction means operatively connected to said siphon units for filling said inlet and outlet conduits with liquid from respective ones of said containers, said suction means having a partial vacuum therein when said respective containers contain liquid therein at a level to be dispensed therefrom by said respective siphon units, the interior of said suction means being open to atmospheric pressure when the level of said liquid in said respective containers is below a level to be dispensed therefrom by said respective siphon units, diaphragms mounted in respective ones of said suction units in position to be subjected to variations in pressure therein, said diaphragms being disposed in a lowered position in said respective suction units when said suction units have said partial vacuum therein, and said diaphragms being disposed in raised position in said respective suction units when the interiors of said suction units are open to atmospheric pressure, and means including switch means engaged with and operable by said diaphragms for selectively controlling energization of said solenoids.

6. A dispensing mechanism for dispensing liquid and comprising a plurality of containers for holding a supply of such liquid to be dispensed, and means for dispensing liquid from individual ones of said containers sequentially on a first-in-first-out basis, said means comprising a plurality of siphon units having inlet and outlet conduits, said inlet conduit of each of said siphon units extending downwardly into a respective one of said containers in position to feed said liquid from said container to said outlet conduit of said siphon unit, a plurality of solenoids, clamping members mounted on respective ones of said solenoids and movable thereby into one position when said respective solenoids are electrically energized, and into another position when said respective solenoids are de-energized, said clamping members being disposed in position to closingly clamp respective ones of said outlet conduits when said clamping member is disposed in said other position and to be disposed out of said clamping relation to said respective outlet conduit when said clamping member is in said one position, suction means operatively connected to said siphon units for filling said inlet and outlet conduits with liquid from respective ones of said containers, said suction means having a partial vacuum therein when said respective containers contain liquid therein at a level to be dispensed therefrom by said respective siphon units, the interior of said suction means being open to atmospheric pressure when the level of said liquid in said respective containers is below a level to be dispensed therefrom by said respective siphon units, diaphragms mounted in respective ones of said suction units in position to be subjected to variations in pressure therein, said diaphragms being disposed in a lowered position in said respective suction units when said suction units have said partial vacuum therein, and said diaphragms being disposed in raised position in said respective suction units when the interiors of said suction units are open to atmospheric pressure, means for feeding electric current to said solenoids for energizing the latter, said last-mentioned means including a normally open switch having one side connectable to one side of a source of electric power, and another side electrically connected at all times to one side of one of said solenoids, the other side of all of said solenoids being at all times electrically connectable to the other side of said source of electric power, and a plurality of other switches electrically connected between said other side of said first-mentioned switch and respective ones of said solenoids and operable by respective ones of said diaphragms for selectively controlling the electrical connection of said first-mentioned switch to said solenoids.

7. A dispensing mechanism for dispensing liquid and comprising a plurality of containers for holding a supply of such liquid to be dispensed, and means for dispensing liquid from individual ones of said containers sequentially on a first-in-first-out basis, said means comprising a plurality of siphon units having inlet and outlet conduits, said inlet conduit of each of said siphon units extending downwardly into a respective one of said containers in position to feed said liquid from said container to said outlet conduit of said siphon unit, a plurality of solenoids, clamping members mounted on respective ones of said solenoids and movable thereby into one position when said respective solenoids are electrically energized, and into another position when said respective solenoids are de-energized, said clamping members being disposed in position to closingly clamp respective ones of said outlet conduits when said clamping member is disposed in said other position and to be disposed out of said clamping relation to said respective outlet conduit when said clamping member is in said one position, suction means operatively connected to said siphon units for filling said inlet and outlet conduits with liquid from respective ones of said containers, said suction means having a partial vacuum therein when said respective containers have liquid therein at a level to be dispensed therefrom by said respective siphon units, the interior of said suction means being open to atmospheric pressure when the level of said liquid in said respective containers is below a level to be dispensed therefrom by said respective siphon units, diaphragms mounted in respective ones of said suction units in position to be subjected to variations in pressure therein, said diaphragms being disposed in a lowered position in said respective suction units when said suction units have said partial vacuum therein, and said diaphragms being disposed in raised position in said respective suction units when the interiors of said suction units are open to atmospheric pressure, means for feeding electric current to said solenoids for energizing the latter, said last-mentioned means including a normally open switch having one side connectable to one side of a source of electric power, and another side electrically connected at all times to one side of one of said solenoids, the other side of all of said solenoids being at all times electrically connectable to the other side of said source of electric power, a plurality of other switches, each of said other switches having a movable contact movable between one position wherein it is electrically connected to a respective one of said solenoids, and another position wherein it is electrically disconnected from said respective solenoid, each of said diaphragms being operably connected to respective ones of said movable contacts in position to dispose said contact in said one position when the level of said liquid in said respective container is above a predetermined level, and to dispose said contact in said other position when the level of said material in said last-mentioned container is below said predetermined level.

8. A dispensing mechanism for use in a vending machine comprising a plurality of redundant containers for the dispensing of liquid from one of said containers; individual liquid flow control means operatively connected to each of said containers, a pressure sensing apparatus individual to each of said flow control means and its respective container, each said sensing apparatus settable to an operative condition, transfer means controlled by said plurality of sensing apparatus for activating the flow control means of a set sensing apparatus to permit dispensing of liquid from its respective container, the pressure sensing apparatus for said last-mentioned container responsive to the depletion of liquid in said container for restoring to an inoperative condition and remaining in said inoperative condition, said transfer means responsive to the restoration of said pressure sensing apparatus to an inoperative condition for activating the flow control means of another set sensing apparatus to permit dispensing of liquid from the container individual to said other set sensing apparatus, and a manual selector having a selection position representative of each of said containers, said selector operable to any of said positions to prepare the transfer means for activating the flow control means of the selected container.

9. A dispensing mechanism for use in a vending machine comprising a plurality of redundant containers for the dispensing of liquid from one of said containers; individual liquid flow control means operatively connected to each of said containers, a pressure sensing apparatus individual to each of said flow control means and its respective container, each said sensing apparatus settable to an operative condition, transfer means controlled by said plurality of sensing apparatus for activating the flow control means of a set sensing apparatus to permit dispensing of liquid from its respective container, the pressure sensing apparatus for said container responsive to the depletion of liquid in said container for restoring to an inoperative condition and remaining in said inoperative condition, said transfer means responsive to the restoration of said pressure sensing apparatus to an inoperative condition for activating the flow control means of another set sensing apparatus to permit dispensing of liquid from the container individual to said other set sensing apparatus, said flow control means including a siphonic conduit network in communication with its respective container and connected to be primed on the setting of its sensing apparatus to its operative condition.

References Cited in the file of this patent
UNITED STATES PATENTS

| | | |
|---|---|---|
| 2,275,471 | Samiran | Mar. 10, 1942 |
| 2,409,245 | Black | Oct. 15, 1946 |
| 2,907,495 | Brous | Oct. 6, 1959 |
| 2,955,726 | Feldman et al. | Oct. 11, 1960 |
| 3,033,422 | Totten | May 8, 1962 |
| 3,055,551 | Johnson | Sept. 24, 1962 |